UNITED STATES PATENT OFFICE.

RUSSELL S. PENNIMAN AND JOHN C. SCHRADER, OF DOVER, NEW JERSEY, ASSIGNORS TO THE ATLANTIC DYNAMITE COMPANY, THE REPANNO CHEMICAL COMPANY, AND THE HERCULES POWDER COMPANY.

GELATINATED EXPLOSIVE.

SPECIFICATION forming part of Letters Patent No. 333,151, dated December 29, 1885.

Application filed January 22, 1885. Serial No. 153,611. (No specimens.)

*To all whom it may concern:*

Be it known that we, RUSSELL S. PENNIMAN and JOHN C. SCHRADER, both of Dover, in the county of Morris and State of New Jersey, have invented a certain new and useful Improvement in Gelatinated Explosive Compounds; and we do hereby declare that the following specification is a clear, true, and complete description of our invention.

In the production of our improved compounds we employ nitrate of ammonia and gelatinated nitro-glycerine of any kind, as, for instance, such as is described in the United States Letters Patent of Nobel, No. 175,735, dated April 4, 1876. Said Letters Patent also describe the use of nitrate of ammonia in compounds with gelatinated nitro-glycerine; but said Letters Patent contain no reference to the deliquescent tendencies of the nitrate of ammonia, and apparently leave it to be assumed that the gelatinated nitro-glycerine will serve as a protecting medium for the nitrate, when in fact it serves so imperfectly as a protector that said suggested compound has, as we believe, never been produced in a practical way for actual service. We find that whether the gelatinated explosive has the consistence of a solid jelly, or that of ordinary sirups, if it be mixed with the nitrate even in its best dehydrated condition, the exposed or surface particles of nitrate soon become hydrated, and that the remainder of the nitrate gradually assumes a similar condition, and renders the compound of little value. We also find that it is exceedingly difficult in a practical way to obtain properly dehydrate nitrate of ammonia, and quite impossible to prevent its becoming more or less charged with moisture during the exposure thereof, and the delays incident to the practical manufacture of explosives.

One object of our present invention is to produce a compound containing gelatinated nitro-glycerine and dehydrated nitrate of ammonia which will be free from deliquescent tendencies, and this we accomplish by combining with the gelatinated explosive specially protected nitrate of ammonia, or, in other words, each grain or particle of said nitrate has a jacket or envelope which in itself will effectually protect the nitrate from the atmosphere. This envelope or jacket may be varied in its character; but we prefer to use what is known to us as "Penniman's Protected Nitrate of Ammonia," which is described in the application of Russell S. Penniman, Serial No. 113,217, and for the purposes of this specification it may be described, when in its best form, as grains of nitrate of ammonia which have a soft jacket or envelope composed of the soft or viscous educts or products of petroleum; but it will also be within our present invention if the grains of nitrate be coated with such hard or solid matter as hard paraffine or stearine, which must first be melted or dissolved in volatile solutions, and applied in the form of a varnish to the nitrate. The hard coatings last described can be fairly relied upon in gelatinated nitro-glycerine compounds, because the gelatinated explosive will generally prevent such abrasive contact of the particles of coated nitrate with each other during the mixing operation as to impair the protecting capacity of their coatings.

Said Letters Patent of Nobel in describing the use of nitrate of ammonia with the gelatinated nitro-glycerine refer to such compounds as having less concentration of power than the gelatinated explosive when employed separately, and that is obviously the case when ordinary nitrate of ammonia is employed, as therein described; but we find that some of our compounds containing the nitrate thoroughly dehydrated, and well protected as by us, have practically the same effective force and the same concentration of power as an equal bulk of the gelatinated explosive. Said Letters Patent of Nobel also describe the use of ordinary nitrate of ammonia in connection with charcoal; and while such coal or other solid carbonaceous matter may be employed in connection with the protected nitrate without departure from our invention, we are enabled to wholly dispense therewith, and thereby to obtain greater specific gravity of the compound, because the coatings of the grains of nitrate are carbonaceous, and they are of so little bulk that they do not materially increase the bulk of the nitrate.

It is to be understood that the proportions of the protected nitrate of ammonia and of the gelatinated explosive may be indefinitely varied without departure from our invention.

If the Penniman protected nitrate of ammonia be not available we proceed to produce the same, as follows: The nitrate of ammonia is first thoroughly dehydrated and granulated by methods well known to chemists, and with each one hundred pounds we combine by thoroughly mixing therewith from ten to twelve per cent. of cosmoline or some one of the other similar products of petroleum.

The gelatinated nitro-glycerine is variably prepared, according to the consistency required. As, for instance, if gelatinated explosive is to be of the consistency of heavy sirup, then from two to four per cent. of nitrated cotton is dissolved in the nitro-glycerine while properly heated, and from four to ten per cent of said nitrated cotton may be employed for producing gelatinated glycerine in various conditions of consistency, even up to what may be termed a solid jelly.

It is well known that gelatinated nitro-glycerine is especially susceptible to "freezing," and when mixed with ordinary nitrate of ammonia it is none the less so; but if the Penniman protected nitrate of ammonia be employed the compound is much less readily frozen into a solid mass than if ordinary unprotected nitrate were used, it being obvious that the soft coating of the grains of nitrate will not harden at such temperature as will harden the gelatinated nitro-glycerine.

If it be desired to produce a compound having in each cubic inch an effective force equal to or greater than a corresponding bulk of the gelatinated explosive, we prefer to use a gelatinated explosive capable, when in fit condition for use, of actually holding the protected nitrate in suspension; as, for instance, by employing, say, six (6) per cent. of the nitrated cotton with the nitro-glycerine. With twenty-five parts of the protected nitrate we mix seventy-five parts of such gelatinated explosive. Cartridges of this compound may be relied upon for performing a service greater than if the same cartridges were filled with the gelatinated explosive alone, and even when the compound is composed of equal parts of the protected nitrate of ammonia and gelatinated nitro-glycerine it can be relied upon for performing the same effective service as the said gelatinated explosive.

The proportions of the gelatinated explosive to the protected nitrate may be widely varied; but there should seldom, if ever, be less of the gelatinated explosive than enough to afford its practically complete continuity throughout the mass.

With the protected nitrate, much less of the gelatine can be relied upon in producing compounds of the lowest grades than when ordinary or unprotected nitrate is employed, because the pores of the grains of nitrate are already filled with the soft coating, and also because the gelatine can be more readily and evenly distributed over the coating than upon the surface of the grains.

Having thus described our invention, we claim as new, and desire to secure by Letters Patent—

An explosive compound composed of gelatinated nitro-glycerine and grains of protected nitrate of ammonia, substantially as described.

RUSSELL S. PENNIMAN.
JOHN C. SCHRADER.

Witnesses:
WM. S. WHITE,
JAS. H. NEIGHBOUR.